Sept. 21, 1937.                J. S. FASTING                    2,093,866
                    APPARATUS FOR REMOVING DUST FROM GASES
                              Filed Aug. 26, 1936

INVENTOR
Johan S. Fasting

ATTORNEYS

Patented Sept. 21, 1937

2,093,866

UNITED STATES PATENT OFFICE 2,093,866

APPARATUS FOR REMOVING DUST FROM GASES

Johan Sigismund Fasting, Copenhagen, Denmark, assignor to F. L. Smidth & Company, New York, N. Y., a corporation of New Jersey Application August 26, 1936, Serial No. 98,050
In Great Britain August 28, 1935

8 Claims. (Cl. 183—52)

This invention relates to apparatus for removing dust from gases of the type in which the dust-laden gases are caused to pass through a layer of bodies to deposit the dust thereon. More particularly, the invention is concerned with a novel apparatus for the purpose mentioned, which includes means by which the bodies are periodically cleaned and the solid matter adhering thereto is removed, these features increasing the efficiency of the apparatus to a considerable degree.

In the apparatus of the type referred to as heretofore constructed, the layer through which the gases are passed has been made up of metal balls, crushed stone, chains or the like, and these bodies require cleaning or replacement from time to time, since otherwise the layer will become clogged by the deposited material and will interpose too great a resistance to the passage of the gases.

According to the present invention, the layer is caused to move as a whole in a direction transverse to the direction of gas flow, and means are provided for removing the bodies from one end of the layer, cleaning them, and returning them to the other end of the layer. Such movement of the layer may be either continuous or intermittent, but continuous movement is preferred, and if intermittent movement is employed, the periods of rest thereof are relatively short. With this arrangement and mode of operation, the apparatus provides a highly effective removal of solids from the gases, and the layer of bodies is kept open so that it offers little resistance to gas flow.

Figure 1:
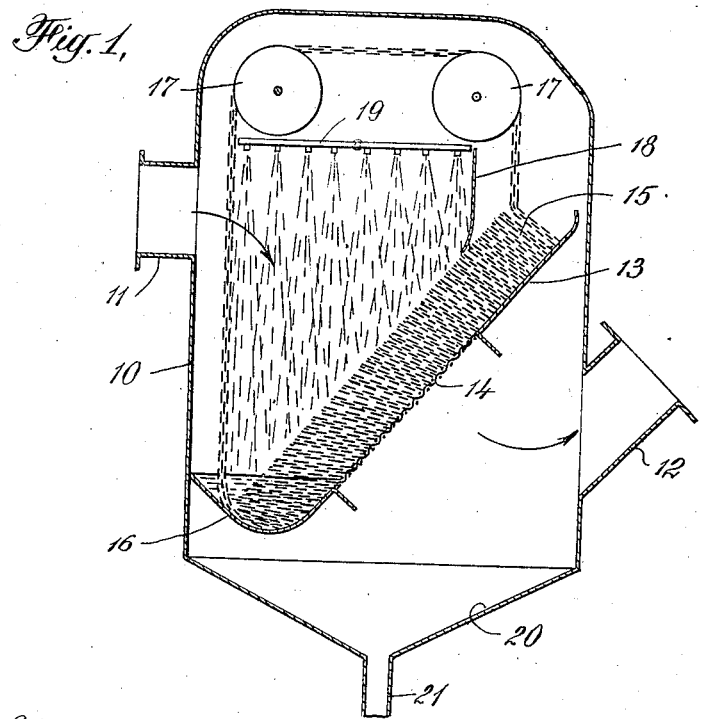
Figure 2:
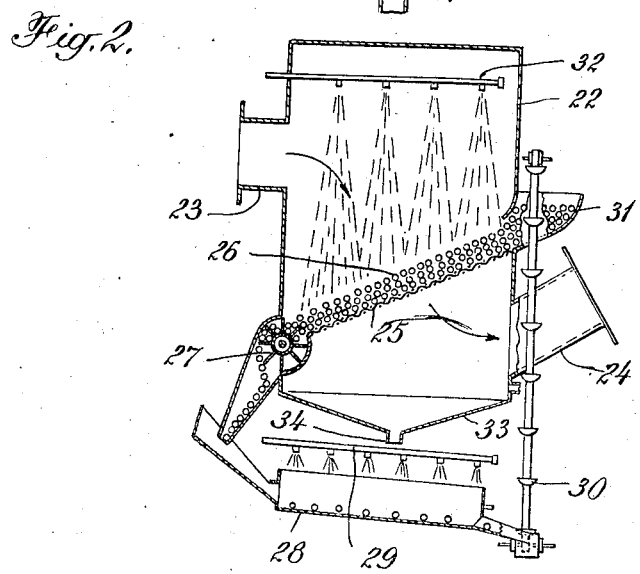

For a better understanding of the invention, reference may be had to the accompanying drawing, in which Fig. 1 is a view in vertical cross-section of one form of apparatus constructed in accordance with the principles of the invention; and Fig. 2 is a similar view showing a modified form of the new apparatus.

Referring to Fig. 1, the apparatus therein illustrated comprises a chamber 10, having an inlet 11 for the dust-laden gases and an outlet 12 through which the cleaned gases are discharged. Extending across the interior of the chamber and lying substantially at right angles to the direction of flow of the gases through the chamber, is a support 13, a portion of which, indicated at 14, is perforated to permit the flow of gas therethrough. A layer 15 of collecting bodies is mounted on the support 13, and in the construction illustrated this layer is made up of the links of endless chains. As the gas outlet is at a substantially lower level than the gas inlet, the support 13 has a considerable inclination, and the layer of collecting bodies moves down the support in part under the influence of gravity.

At its lower end, the support 13 is formed to provide a vessel 16 containing a body of water, and the chains forming the layer enter the water to be cleaned thereby of the dust particles which they carry. The chains are then removed from the lower end of the layer in the bottom of the vessel and pass over wheels 17, 17, at least one of which is driven. From the second of the wheels, the chains move down to the top of the layer, so that the cleaned links will again take part in the collecting operation as the layer moves down the support. Near the upper end of the layer, a partition 18 is provided to cause proper distribution of the chains, so that a layer of substantially uniform thickness is provided. Preferably, the individual chains lie side by side on the support in parallel compartments formed by partition members, (not shown).

The moving layer is continually wet by water discharged thereto from one or more spray pipes 19 mounted within the chamber near the upper end thereof, and the discharging water serves to remove some of the dust from the gases before they reach the layer 15. If desired, the chains may be cleaned after they have left the lower end of the layer exposed to the gases and as they are passing to the upper end of the layer by means other than the vessel 16, as for example, spray means may be used which discharge strong jets of cleaning water on the chains, preferably in their upward travel to the first wheel 17.

The water in the vessel 16 at the bottom of the layer is continually discharged into the lower end of the chamber 10, this end being formed as a hopper 20 having a discharge spout 21 through which the water and the collected solids are discharged.

Instead of forming the collecting layer of chains as illustrated in Fig. 1, the layer may be made up of bodies taking the form of balls, chain links, short pieces of chain, or similar elements which are caused to slide down a perforated support under the influence of gravity. This construction is illustrated in Fig. 2, in which the chamber 22 having a gas inlet 23 and a gas outlet 24 is provided with a perforated support 25 extending at an incline across the chamber and substantially transverse to the direction of flow of the gases from the inlet to the outlet. This support carries a layer of collecting bodies 26 which move down the support by gravity and are removed through a rotary star gate 27 at the lower end of the support. Beyond the gate, the bodies are delivered to a trough 28, to which cleaning water is supplied through a nozzle pipe 29. The trough is at a slight incline, and at its lower end the collecting bodies are delivered to the buckets 30 of an elevator illustrated diagrammatically, the elevator carrying the bodies upward and discharging them into a hopper 31 at the upper end of the support. The layer is kept wet in this form of the apparatus by water discharged upon it by means of a nozzle pipe 32, and the water and collected solid material are discharged at the lower end of the chamber through a hopper 33 having a discharge spout 34.

It will be apparent that in both forms of the apparatus illustrated the layer of collecting bodies is as a whole moved from one end of the support to the other, across the path of travel of the gases, and the collecting bodies are cleaned as they are removed from the lower end of the layer and before they are returned to the upper end. The collecting bodies are thus periodically cleaned so that the layer never becomes clogged, and it offer little resistance at any time to the passage of the gases therethrough. The continuous discharge of water in the form of a spray upon the bodies in the layer serves not only to remove dust from the gases but also assists in cleaning the bodies, and this also increases the efficiency of the apparatus.

I claim:

1. Apparatus for removing dust from gases which comprises a chamber having a gas inlet and a gas outlet, a support within the chamber extending substantially transverse to the direction of gas flow from the inlet to the outlet, a layer of collecting bodies on said support, the gas passing through the layer in its flow through the chamber, said bodies comprising endless chains, means for advancing the chains to cause the links thereof to be removed from one end of the layer and returned to the other end thereof, and means for cleaning said chains at the end of the layer where the links are removed from the layer and before said links are returned to the layer.

2. Apparatus for removing dust from gases which comprises a chamber having a gas inlet and a gas outlet, a support within the chamber extending substantially transverse to the direction of gas flow from the inlet to the outlet, a layer of collecting bodies on said support, the gas passing through the layer in its flow through the chamber, said bodies comprising endless chains, wheels within said chamber about which the chains are led, at least one of said wheels being driven and serving to advance the chains to remove the links thereof from one end of the layer and return them to the other end, and means for cleaning the links of the chains at the end of the layer at which they are removed and before they are returned to the layer.

3. Apparatus for removing dust from gases which comprises a chamber having a gas inlet and a gas outlet, a support within the chamber extending substantially transverse to the direction of gas flow from the inlet to the outlet, a layer of collecting bodies on said support, the gas passing through the layer in its flow through the chamber, said bodies comprising endless chains, wheels at the upper end of the chamber about which the chains are led, at least one of said wheels being driven and serving to advance the chains to cause the links thereof to be removed from one end of the layer and returned to the other end, and means for directing cleaning fluid on the stretches of the chains leading from the lower end of the layer to the upper end thereof.

4. Apparatus for removing dust from gases which comprises a chamber having a gas inlet and a gas outlet, a support within the chamber, a vessel at one end of the support and containing cleaning fluid, a layer of collecting bodies on the support extending substantially transverse to the direction of gas flow from the inlet to the outlet, the gas passing through the layer, and means for moving the layer as a whole along the support and into the vessel, said means operating to remove bodies from the vessel and return them to the opposite end of the layer.

5. Apparatus for removing dust from gases which comprises a chamber having a gas inlet and a gas outlet, a support within the chamber, a vessel at one end of the support and containing cleaning fluid, a layer of collecting bodies on the support extending substantially transverse to the direction of gas flow from the inlet to the outlet, the gas passing through the layer, means for moving the layer as a whole along the support and into the vessel, said means operating to remove bodies from the vessel and return them to the opposite end of the layer, and means for directing liquid upon the layer.

6. Apparatus for removing dust from gases which comprises a chamber having a gas inlet and a gas outlet, a sloping support within the chamber extending generally transverse to the direction of flow of the gases through the chamber, a plurality of endless chains within the chamber having portions in contact with said support, means for supporting the portions of the chains out of contact with the support, the chains having a substantially greater length than the circuit through which they move through the chamber whereby a layer thereof of substantial thickness is carried by said support, means for advancing the chains, and means for cleaning the chains after they have passed out of contact with the support.

7. Apparatus for removing dust from gases which comprises a chamber having a gas inlet and a gas outlet, a sloping support within the chamber extending generally transverse to the direction of flow of the gases through the chamber, a plurality of endless chains within the chamber having portions in contact with said support, means for supporting the portions of the chains out of contact with the support, the chains having a substantially greater length than the circuit through which they move through the chamber whereby a layer thereof of substantial thickness is carried by said support, means for advancing the chains, and a vessel containing liquid through which the chains pass to be cleaned after they have passed out of contact with the support.

8. Apparatus for removing dust from gases which comprises a chamber having a gas inlet and a gas outlet, a sloping support within the chamber extending generally transverse to the direction of flow of the gases through the chamber, a plurality of endless chains within the chamber having portions in contact with said support, means for supporting the portions of the chains out of contact with the support, the chains having a substantially greater length than the circuit through which they move through the chamber whereby a layer thereof of substantial thickness is carried by said support, means for advancing the chains, means for discharging liquid on the layer, and means for cleaning the chains after they have passed out of contact with the support.

JOHAN SIGISMUND FASTING.